G. W. STURMER.
LUBRICATOR FILLER.
APPLICATION FILED MAY 31, 1918.
1,286,830.
Patented Dec. 3, 1918.
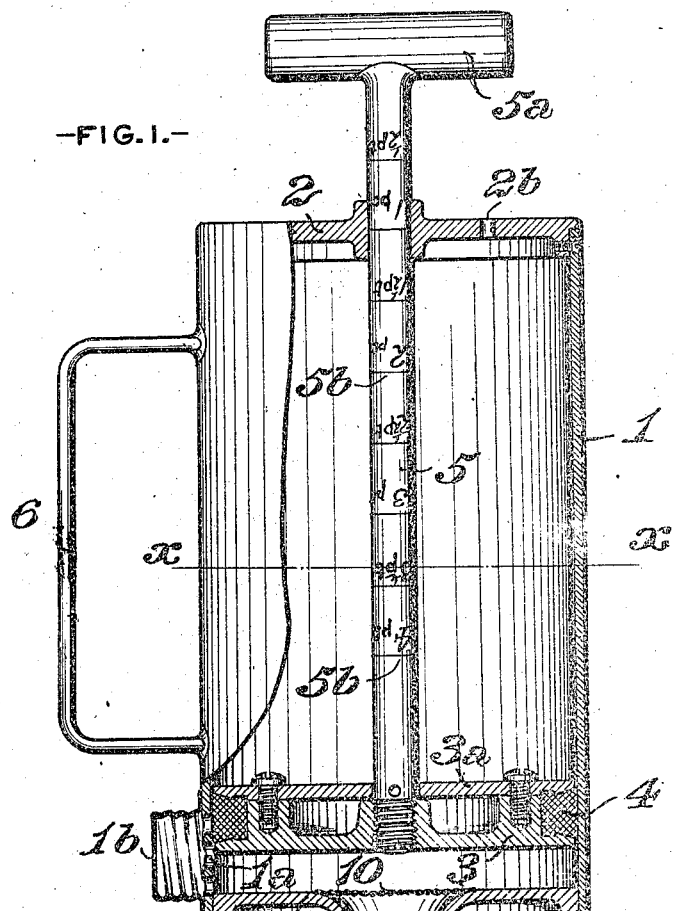
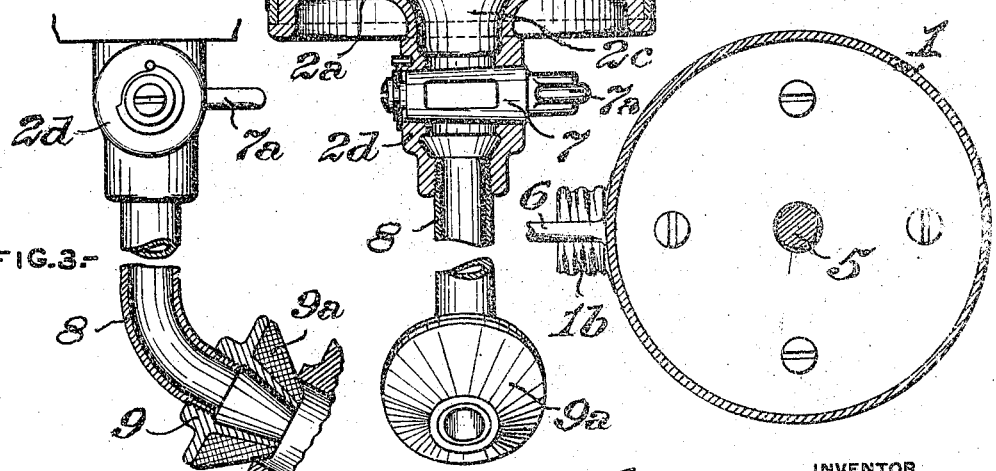
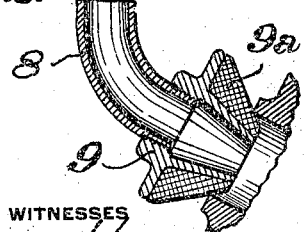
WITNESSES
INVENTOR
George W. Sturmer,

UNITED STATES PATENT OFFICE.

GEORGE W. STURMER, OF BALTIMORE, MARYLAND.

LUBRICATOR-FILLER.

1,286,830.

Specification of Letters Patent.

Patented Dec. 3, 1918.

Application filed May 31, 1918. Serial No. 237,394.

*To all whom it may concern:*

Be it known that I, GEORGE W. STURMER, of Baltimore, Maryland, have invented a certain new and useful Improvement in Lubricator-Fillers, of which improvement the following is a specification.

My invention relates to means for supplying oil to the lubricators of locomotive engines, and its object is to provide an appliance of such type which shall be of simple and inexpensive construction and light weight, and which shall present the advantages of effecting the saving of oil, by preventing the loss from spilling which is incident to the ordinary operation of filling lubricators from cans; preventing the access of dirt to the lubricator; reducing the time required for filling; and measuring the quantity of oil which is supplied.

The improvement claimed is hereinafter fully set forth.

In the accompanying drawing: Figure 1 is a longitudinal central section through a lubricator filler embodying my invention; Fig. 2, a transverse section on the line *x x* of Fig. 1, and; Fig. 3, a view, partly in elevation and partly in longitudinal axial section, of the lubricator filling pipe and adjoining portion of the body.

In the practice of my invention, I provide a cylindrical body or barrel, 1, of comparatively light plate metal, which is closed, at its ends, by heads, 2, 2ª, and is finished to receive a piston, 3, to which is bolted a follower, 3ª, a suitable packing ring, 4, being interposed between the piston and follower. The piston is secured upon a piston rod, 5, which passes through the head, 2, of the body, by which head it is guided, and carries a handle, 5ª, on its outer end. Measuring indications, 5ᵇ, are marked upon the piston rod, at different points in its length, corresponding with the quantities of oil which are contained in the space between the piston and the delivery cock hereinafter described, when the piston rod is drawn out of the body sufficiently far to expose the respective indications. An atmospheric relief opening, 2ᵇ, is formed in the head, 2, to prevent resistance to the outward movement of the piston rod and connected piston, by compression of air within the body. A supply opening, 1ª, which is closed by a removable screw cap, 1ᵇ, is formed in the body, adjacent to the head, 2ª, and a light longitudinally extending operating handle, 6, of substantially U form, is welded to the body, preferably in line with the axis of the supply opening.

A central delivery passage, 2ᶜ, is formed on the head, 2ª, the wall of said passage being outwardly prolonged to form the casing, 2ᵈ, of a delivery cock, 7, of the plug type, having an operating handle, 7ª. A flexible filling pipe, 8, is connected to the outer end of the casing, 2ᵈ, said pipe having a nozzle, 9, on which it fitted a conical washer, 9ª, of rubber or other elastic and compressible material, secured to its outer end. A strainer, 10, of fine wire gauze or perforated metal, is welded to the head, 2ª, and extends completely across the delivery passage, 2ᶜ, thereof, said strainer preventing any particles of dirt that may be contained in the oil supplied to the body from passing into the delivery passage and delivery pipe.

In the operation of the appliance, the piston and piston rod are drawn out to such distance that the space between the piston and the delivery cock shall be, as shown by one of the measuring indications, of such volume as to be capable of containing the quantity of oil which it is desired to supply to the lubricator. The cap is removed from the supply opening, oil poured into the body until the space above specified is filled, and the cap is replaced. The oil thus supplied is delivered into the lubricator, by inserting the conical washer of the delivery pipe into the opening in the body of the lubricator which is normally closed by the filling plug thereof; opening the delivery cock, 7, forcing the piston inwardly and tilting the appliance by its handle, until all the oil is discharged into the lubricator, after which the filling plug of the lubricator is screwed into normal position. It will be seen that, in such filling operation there is no liability to spilling or waste of oil, or admission of dirt into the lubricator, and that a lubricator may be so filled, irrespective of its position on the locomotive, and without danger of scalding the operator by leakage of steam through the throttle of the lubricator, when filling it.

I claim as my invention and desire to secure by Letters Patent.

A portable filling can for locomotive lubricators, comprising a closed end cylinder having a central discharge passage in one end, a flexible pipe, adapted to be applied to the filling opening of the lubricator, communicating with said passage, an external valve to control the flow of oil through said passage and pipe, a piston fitted in said cylinder and a piston rod passing through the other end of the same and provided with a handle, a filling nipple on the wall of said cylinder adjacent to said first mentioned end and a cap fitted to said nipple, and a handle on said cylinder parallel to its axis and in line with said nipple.

GEORGE W. STURMER.

Witnesses:
J. SNOWDEN BELL,
GEORGE E. BROWN.